(12) United States Patent
Lai

(10) Patent No.: US 6,299,173 B1
(45) Date of Patent: Oct. 9, 2001

(54) MECHANICAL END FACE SEAL RING HAVING A COMPLIANT SEAL FACE

(75) Inventor: Wei-Tang Lai, Hoffman Estates, IL (US)

(73) Assignee: John Crane Inc., Morton Grove, IL (US)

(*) Notice: Subject to any disclaimer, the term of this patent is extended or adjusted under 35 U.S.C. 154(b) by 0 days.

(21) Appl. No.: 09/415,845

(22) Filed: Oct. 12, 1999

Related U.S. Application Data

(60) Provisional application No. 60/104,675, filed on Oct. 16, 1998.

(51) Int. Cl.$^7$ .................................................. F16J 15/34
(52) U.S. Cl. ........................... 277/348; 277/352; 277/353; 277/399; 277/402
(58) Field of Search .................................. 277/348, 352, 277/353, 360, 399, 402, 400

(56) References Cited

U.S. PATENT DOCUMENTS

| | | |
|---|---|---|
| 3,499,653 | 3/1970 | Gardner . |
| 3,511,510 | 5/1970 | Lindeboom . |
| 3,628,799 | 12/1971 | Wiese . |
| 3,751,045 | 8/1973 | Lindeboom . |
| 3,804,424 | 4/1974 | Garnder . |
| 4,376,540 | 3/1983 | Kotzer et al. . |
| 4,407,512 | 10/1983 | Trytek . |
| 4,792,146 | 12/1988 | Lebeck et al. . |
| 4,850,599 | 7/1989 | Parmar . |
| 4,884,945 | 12/1989 | Boutin et al. . |
| 5,121,931 * | 6/1992 | Matsushita et al. ................... 277/400 |
| 5,135,235 | 8/1992 | Parmar . |
| 5,143,384 | 9/1992 | Lipschitz . |
| 5,294,132 | 3/1994 | Duffee et al. . |
| 5,490,679 | 2/1996 | Borrino et al. . |
| 5,609,342 | 3/1997 | Peterson et al. . |
| 5,681,047 | 10/1997 | Klostermann et al. . |
| 5,755,817 | 5/1998 | Prouty et al. . |
| 5,938,206 * | 8/1999 | Klosterman ........................... 277/400 |

FOREIGN PATENT DOCUMENTS

WO95/02137  1/2000  (WO) .

* cited by examiner

Primary Examiner—Chuck Y. Mah
Assistant Examiner—Enoch E Peavey
(74) Attorney, Agent, or Firm—Wood Phillips VanSanten Clark & Mortimer

(57) ABSTRACT

A mechanical end face seal includes one seal ring having two elements, a seal face extension portion immediately adjacent a sealing face and a seal ring body removed from the sealing face. Each of the ring elements has a radial outer diameter dimension and a radial inner dimension. The seal face extension portion is defined by an annular gap separating the seal ring body from the seal face extension portion. The annular gap opens out onto the high-pressure side of the seal. The axial thickness of the seal face extension portion is much smaller than the radial dimension of the sealing face. The seal face extension portion is connected to the thicker seal ring body by means of a thin connecting "neck", which has a small radial dimension than the radial dimension of the sealing face. Preferably, the radial dimension of the neck has a ratio relative to the radial width of the ring sealing face between about 0.10 to about 0.70, more preferably about 0.25 to about 0.60, and most preferably about 0.35 to about 0.45. The relative ratio of the axial thickness of the seal face extension portion to the radial width of the second sealing face is in a preferable range of from about 0.03 to about 0.60, in a more preferable range of from about 0.05 to about 0.50, and in an optimal range of from about 0.08 to about 0.15.

25 Claims, 5 Drawing Sheets

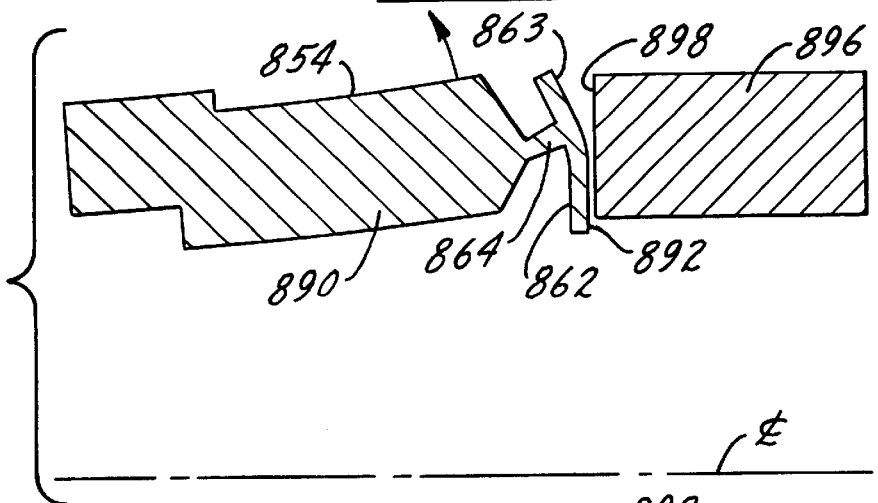
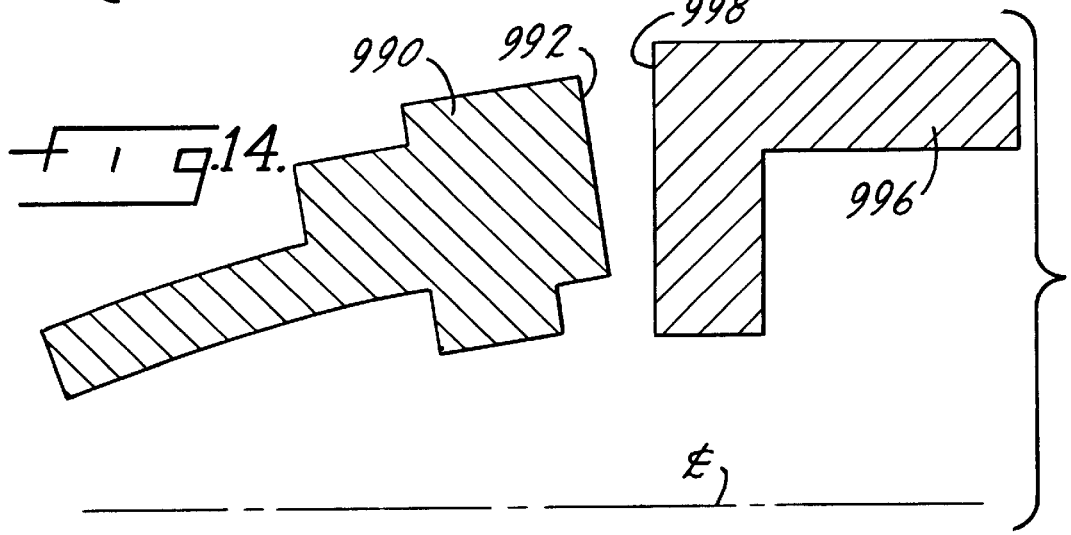
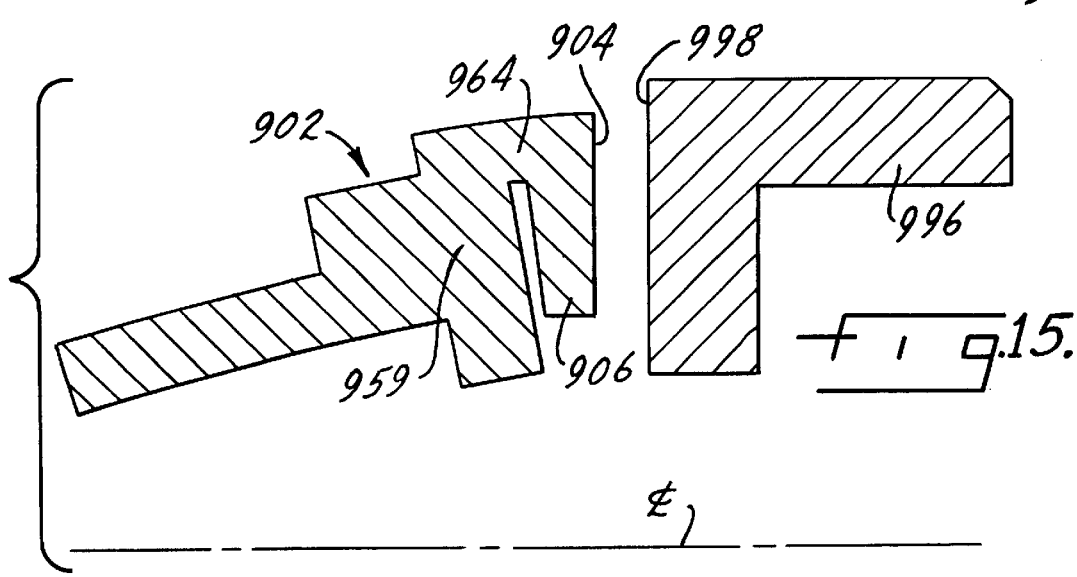

MECHANICAL END FACE SEAL RING HAVING A COMPLIANT SEAL FACE

CROSS-REFERENCE TO RELATED APPLICATION

This invention claims the benefit of U.S. Provisional Application Ser. No. 60/104,675, filed on Oct. 16, 1998.

BACKGROUND OF THE INVENTION

1. Field of the Invention

This invention relates generally to mechanical end face seals and more specifically to such seals used in devices for containing process fluids under high pressure, and especially for containing process fluids including highly viscous liquids, the devices accommodating for distortion caused by thermal gradients and/or by high pressure differentials between the outer and inner diameters of such seals.

2. Background Art

Mechanical end face seals have become high technology items utilizable in a variety of industries. These types of seals are designed with a great deal of care and attention to the materials, shapes, dimensions and tolerances of the component parts. Such attention to detail in the design is necessary in order to accommodate a great number of characteristics, any of which characteristics is liable to affect the efficiency or operation of seals of this type. Minor changes or alterations to any one of about 10 physical features of a seal, its components or its sealing environment may, and in most cases will, result in a change in the sealing characteristics, sealing capability, wear, endurance and/or material integrity.

In most cases, it is desirable for the seals of this type to operate maintenance and trouble free for extensive periods of time, on the order of years. The seals are used in machinery which cannot be shut down for long without severely impairing the operation and efficiency of, for example, a large chemical plant or refinery.

For contacting seals, which seal devices contain highly viscous liquids, such as oils or petroleum, a different set of considerations occurs because of the high levels of shear heating which develop between the seal faces. In applications which are required to handle two or more types of liquids at different times, the fluids having different fluid properties, at varying pressures and other sealing conditions, may result in uneven or counterproductive seal operation. For example, highly viscous liquids, such as crude oil, produce frictional or shear heating at the seal faces, which translates into a temperature and/or pressure phenomenon in the seal ring known as coning.

It has been recognized that uneven heating may result in thermal distortion of a seal ring and that high pressure differentials between the inboard and outboard diameters of the seal rings may result in pressure distortions of the ring material. Such distortions are undesirable because they cause the normally flat opposed mating seal faces of the seal rings to diverge from the normal sealing engagement between the seal ring faces. In a non-contacting seal, distortion of the seal rings normally causes the outer diameters of each seal ring face to rotate about the centroid toward the centerline of the seal ring, causing the seal gap to become wider at the inner diameter of the seal ring interface and to narrow at the outer diameter. This seal ring distortion and change in axial depth of the seal ring gap is not conducive to optimal sealing capability, because the effects of the spiral grooves pumping a gas against a dam are dissipated if the seal gap is not minimized and the dam is not adjacent the opposed mating sealing face. The narrowing of the gap at the outer diameter is undesirable for a non-contacting seal because a smaller gap renders the seal faces susceptible to undesirable contact, resulting in premature wear of the seal faces.

Coning is an undesirable phenomenon which occurs from heat differentials or gradients occurring between axial ends of a seal ring. Excess generated heat causes the seal ring material to expand at different rates depending on temperature, resulting in material expansion at different rates and in seal ring distortion. Typically, for a conventional seal, the distortion results in the seal faces at the interface separating at the outer diameter. As the seal ring material expands faster at the seal face end, the annular seal rings take a slightly conical shape; hence, the designation of this phenomenon as coning.

Convex distortion, or coning, develops when fluids are sealed that are viscous, such as oil. Such fluids are subjected to shear heating in the gap between the opposed seal faces of the seal rings. Due to the seal characteristics, uneven temperature distribution develops over the seal rings, and the interfacial gap between the two seal faces becomes larger at the outer diameter than at the inner diameter, as a result of differences in the expansion of the seal ring material.

Several disadvantages result from the uneven ring distortion and from the resulting gap difference in the seal gap between the inner and outer diameters. For seals which are pressurized at the outer diameter, the increased gap permits fluid, which is at a high pressure, to enter the seal interface and thereby to increase the hydrostatic opening force. This leads to a greater film thickness and a higher than desirable leakage rate.

Conventional approaches addressing the coning problem have included increasing the closing force, either by increased spring load or providing a higher balance ratio, or by relying on a concave pressure distortion of seal rings which are pressurized at the outer diameter. Increasing the load so as to urge the seal rings more forcefully toward each other minimizes the interfacial gap, but results in even more shearing heat generation, which leads to even greater coning problems. The closing force which is required to reduce the film thickness, and consequently leakage, must increase with fluid viscosity. Eventually, further increases in the load results in high seal face temperature, which collapses the oil film and may cause unwanted rubbing contact of the seal faces. At this highly loaded condition, the seal ring materials are likely to fail from severe wear, carbon blistering or carbide heat checking.

Alternatively, it has been found that concave distortion of outer diameter pressurized seals can be modified by changing seal cross-sectional geometry. One example of such a pressure-induced concave distortion, calculated to counter and compensate for thermal distortion, has been proposed by Lebeck et al. and is the subject of U.S. Pat. No. 4,792,146. A "thermal-net taper" is disclosed by Lebeck et al. and relies on a specified geometry which is claimed to match the distortion of each of the rings so that the seal faces remain parallel under the predetermined sealing conditions. The seal faces are described as remaining in a parallel relationship over a large range of heat distribution and pressure distortion parameters. As described, predetermined parameters for the materials, and other factors, limit the number and range of applications available for use of seals having the Lebeck et al. characteristics and structures.

Similarly, U.S. Pat. No. 5,135,235, issued to Parmar and assigned to a company related to the assignee of the present invention, also utilizes a distinct cross-sectional configuration calculated to cause desirable distortion of the seal faces so as to maintain seal face parallelity over a range of localized temperatures.

Although the types of arrangements discussed in U.S. Pat. Nos. 4,792,146 and 5,135,235 are useful for applications in which the sealing conditions are mostly predictable, e.g., applications including constant pressure differentials across the seal faces, when conditions are variable or sudden changes in the sealing conditions raise additional considerations which render these configurations less than optimal. For example, in conditions where the pressure is low, or the shaft rotational speed is higher than optimal, the heat generated by shear heating and frictional contact is excessive to the detriment of the seal's capability to maintain the seal faces parallel to each other.

Conflicting requirements in seal design are encountered for seals utilized at extremely high pressures, i.e., in excess of 1800 psi. The pressure forces acting on such seals necessitate a large thickness of the seal ring in order to provide rigidity to withstand the high pressures. Likewise, the rigidity of a thick ring detracts from flexibility and cannot easily provide a compliant seal face. The thicker rings distort in accordance with the teachings of the above described patents. If such a seal is also expected to operate at low pressures as well, an optimal configuration for maintaining the seal faces parallel becomes extremely hard to achieve, since typical pressure distortions at low pressures are insufficient to overcome expected distortions resulting from thermal heating in known seal ring configurations.

In the context of a non-contacting type seal, commonly assigned U.S. Pat. No. 3,804,424 describes a gas seal having thermal and pressure distortion compensation. The seal relies upon a number of orifices passing through one of the rings to provide pressurized fluid to the seal interface. The orifices are in communication between the high pressure fluid being sealed at the outer diameter of the seal and a chamber between an inner and outer diameter dam of the primary ring. The resulting increase in pressure in the seal interface provides for an even pressure differential across the interface.

Minimization of seal face distortion has been addressed often, most recently in related and commonly assigned U.S. Pat. No. 5,681,047, which is utilized in non-contacting seal applications. U.S. Pat. No. 5,681,047 illustrates and describes a non-contacting type seal for sealing relatively inert gas, in a groove-type seal. The problem addressed by the patent relates to high-pressure differentials across the seal faces and the distortion caused by that differential.

Other attempts at correcting for seal face distortion are disclosed by U.S. Pat. No. 5,755,817, drawn to a pump configuration having a hydrostatic seal which includes a seal element with a recess in the seal body of from approximately 0.10 inch and about 0.15 inch depth. The location of the recess along the seal element can be altered to alter the control over flexing, but caution is taught in order not to create excessive stress concentrations within the seal element. The recess is considered to resist tapering effects and to provide a seal that is responsive to both temperature and pressure effects.

Accordingly, what has been found necessary for seals that undergo variable conditions, or for seals which are intended to seal highly viscous fluids, is a highly compliant seal face configuration, in conjunction with a rigid seal ring construction capable of withstanding higher pressures, if necessary. The compliant seal face configuration ideally compensates for a wide range of pressure and temperature conditions and can be used in any of a number of seal configurations.

SUMMARY OF THE INVENTION

Accordingly, there is provided herein a mechanical seal face for sealing fluid under pressure between a housing and a relatively rotating shaft extending through a bore in the housing, the seal comprising (a) an annular first seal ring having a seal face portion with a first sealing face adapted to be disposed annularly about a shaft and adapted to be secured in fluid tight relation to either the shaft or the housing, (b) an axially movable second seal ring adapted to be disposed annularly about the shaft of a device and adapted to be secured in fluid tight relation to the other one of the shaft or the housing that is not secured to the first seal ring, the second seal ring including a seal face portion having a radial second annular sealing face of predetermined radial width in opposing mating relation with the first sealing face to define a seal interface. At least one of the seal rings has a seal face extension portion and structure which defines a seal body and a neck attaching the seal body to the seal face extension portion.

In a preferred embodiment, the seal face extension portion of the ring includes a range of predetermined values in relative axial and radial dimensions relating the thickness of the seal face extension portion, the neck and the radial width of the seal face of the ring including the seal face extension portion. The neck joining the seal face extension portion to the seal body has a radial width of at most 70 percent of the predetermined radial width of the annular sealing face of the ring. The seal arrangement also includes a biasing means for urging the ring seal faces toward each other into a confronting, mating relationship.

A preferred set of ratios of the axial thickness of the seal face extension portion to the radial width of the primary ring have been determined to be between about 0.03 to about 0.60, a more preferable ratio range of from 0.05 to 0.50, and an optimal range set of from about 0.08 to about 0.15. Similarly, the radial thickness of the neck should be in a predetermined set of ranges of the ratio of the neck radial thickness relative to the seal face of from about 0.10 to 0.70, and more preferably of from about 0.25 to about 0.60, and optimally from about 0.35 to about 0.45.

BRIEF DESCRIPTION OF THE DRAWINGS

FIG. 13 illustrates yet another embodiment of a seal ring pair where the primary ring has an inventive T-head seal face.

FIG. 14 illustrates in a schematic view, an exaggerated standard non-contacting, inner diameter pressurized seal ring pair, including temperature gradations developed by finite element analysis.

FIG. 15 is a schematic illustration of a seal ring pair according to the present invention, for use in an inner diameter, non-contacting gas seal arrangement, and includes illustrations of temperature gradations developed by finite element analysis.

DETAILED DESCRIPTION OF THE PREFERRED EMBODIMENTS

The features of this invention can be utilized in either a single or double seal arrangement. For the most part, the other elements of the seal arrangement whether a single or double seals are used, are similar to those elements of a conventional contacting seal, as described and claimed in the aforementioned U.S. Pat. No. 5,135,235, the subject matter of which is incorporated herein. Accordingly, the description of those seal elements not directly incorporating features of the invention will not be discussed in great detail. Such description is not required for practice of this invention, which may be applicable in a wide range of seal configurations known to practitioners in the seal industry. Only the substantive differences, which implicate inventive features of the seal arrangements and embodiments, will be described below in detail.

The inventive features described and claimed herein seal are not dependent on whether the seal arrangement is an outer diameter or an inner diameter pressurized seal, such as U.S. Pat. No. 5,755,817, and may be utilized in either. However, an outer diameter pressurized seal is the preferable configuration and the one described herein in most detail.

For purposes of this description, the invention will be described primarily as being a contacting seal for use with pressurized oil as a process fluid. In an oil seal, the oil normally forms a fluid lubricating film between the seal faces to create a seal gap, as is described. In FIGS. 14–15, a non-contacting, gas seal configuration is illustrated. In a gas seal, spiral grooves form a gas film in the seal interface, which provides lubrication between the seal faces.

The present invention is also utilizable in a non-contacting seal arrangement in which the mating ring seal face may have spiral grooves (not shown) in accordance with the teaching of other similar seals. Non-contacting seal face configurations having spiral grooves are taught in commonly assigned U.S. Pat. Nos. 4,212,475, 5,375,853 and 5,681,047, the teachings of which are hereby incorporated by reference, where appropriate. Certain modifications are required in seal configurations made according to those patents, which are within the scope of knowledge of a person having ordinary skill in the art, and such modifications are contemplated herein.

Figure 1:
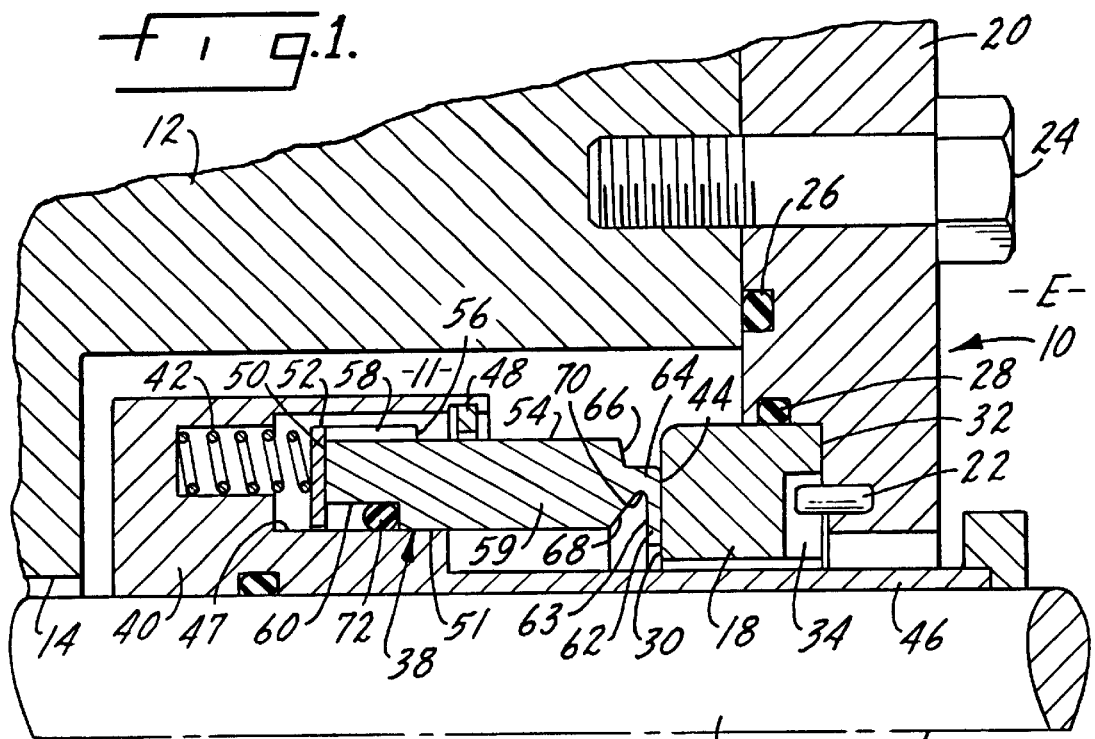
FIG. 1 illustrates a single seal having a primary ring according to the present invention.

Referring now to FIG. 1, an inventive seal embodiment is illustrated in a single seal arrangement 10. The seal arrangement 10, as are all of the embodiments described herein, is intended to seal a fluid having some pressure differential across the seal in a contacting seal arrangement. As in most mechanical seals, the seal arrangement 10 is intended to seal a fluid within a chamber 11 defined by a housing 12. The housing 12 has an aperture 14 through which a shaft 16 extends. Because the shaft 16 is intended to rotate relative to the housing 12, a means must be provided to prevent or inhibit leakage of the process fluid out of the chamber 11 through the gap 14.

The mechanical face seal arrangement 10 includes a seal ring 18 rotationally fixed relative to a gland plate 20 by a retainer pin 22. The gland plate 20 is attached to the housing 12 by a bolt 24 and sealed to the housing by an O-ring 26. A second O-ring 28 seals the seal ring 18 to the gland plate 20 preventing leakage from between the mating ring and the gland plate so that no fluid escapes from the chamber 11 toward the atmosphere or environment E outboard of the seal arrangement 10.

Seal ring 18 may be also referred to as a mating ring 18, and in the embodiment of FIG. 1, is a conventional contacting seal ring having a generally planar annular seal face 30 and a back face 32. A groove or notch 34, disposed in the back face of the mating ring 18 acts to receive the retainer pin 22 which retains the mating ring from rotating with the shaft 16.

An axially movable primary ring 38 is retained within a sleeve and retainer assembly 40 which rotates with the shaft 16. Primary ring 38 is axially biased by a biasing means, such as a plurality of equally spaced-apart springs, one such spring 42 being shown in the seal arrangement 10 of FIG. 1. The biasing means bias the primary ring 38 toward the mating ring 18, urging an opposed seal face 44 of the primary ring 38 toward contact with the opposed seal face 30 of the mating ring 18. The retainer 40 may comprise other standard modifications, such as an integrally attached sleeve 46, the axial position of which may be adjustable by precisely locating the axial position of the retainer 40, thereby resulting in a predetermined or desired amount of loading force exerted on the primary ring 38 by the biasing means 42. Retainer 40 further comprises an inner cylindrical surface 47 upon which the primary ring 38 rides and may be axially movable in relation thereto, as is described below.

Primary ring 38 is held within the retainer 40 by a snap ring 48, as is conventional in a cartridge-type seal, such as the seal 10 which is illustrated in FIG. 1. Between the springs 42 and the primary ring 38, a disc 52 is preferably interposed to more evenly distribute the biasing forces acting on the primary ring 38, and to provide a uniform loading force acting on the primary ring seal face 44 and urging the primary ring seal face 44 toward contact with the opposed mating seal face 30 of the mating ring 18. One or more axially extending notches 58 provide for a drive mechanism of the primary ring 38, in accordance with known principles.

The primary ring 38 encompasses an important feature of this invention in its most essential form. The shape and dimensions of the primary ring 38, sometimes referred to as the primary ring geometry, results in the desired and unexpected results and capability to seal highly viscous liquids, such as oil, while simultaneously preventing excessive leakage across the seal 10.

Primary ring 38 is an annular ring and is shown in FIG. 1 in cross-section as is conventional in illustrating mechanical face seals. The primary ring 38 includes a sealing face 44, and a back face 50, which in normal operation comes into contact with the disc 52. The outer diameter of ring 38, cylindrical surface 54, may include a step 56 and one or more drive groove notches 58 in which conventional drive dents (not shown) in the retainer 40 retain the primary ring in circumferential rotation with the retainer 40. Such configurations are known, and provide the ability of the seal ring 38 to move axially relative to the retainer 40, but do not permit relative circumferential movement.

Another conventional feature in primary ring 38 disposes in inner diameter cylindrical surface 51 which, together with outer cylindrical surface 54, defines a primary ring middle section 59. At the end of the ring 38, adjacent the back face 50, surface 51 includes a step or annular shoulder 60 for accommodating an O-ring 72 which provides for a sealing engagement between the retainer cylindrical surface 47 and the primary ring 38. The inner diameter cylindrical surface 51 has a diameter just slightly larger than the diameter of retainer cylindrical surface 47 of retainer 40, which feature provides sufficient clearance between the surfaces 47,51 and permits axial motion of seal ring 38 while simultaneously causing the secondary seal O-ring 72 to seal between the ring 38 and retainer 40.

For the most part, the rear section of primary ring 38 adjacent the back face 50 is conventional and does not deviate from known seal ring configurations. The middle section 59 of the primary seal ring, essentially an annular volume disposed between the cylindrical surfaces 54 and 51, is also conventional in this embodiment. The forward section of the primary ring 38, however, adjacent the seal ring sealing surface 44, includes several inventive features which are described in detail below.

The sealing face 44 of primary seal ring 38 is disposed on an annular, thin wafer-like seal face portion or extension 62. Extension 62 is connected to the primary ring middle section 59 by a "neck" 64. The neck 64 is preferably disposed radially inwardly of the outermost extent of the outer diameter surface 54 of ring 38.

The primary ring 38 includes a recessed, essentially radial, annular surface 66, extending between the outer cylindrical surface 54 and the neck 64. Although this surface 66 is shown as being angled or chamfered relative to seal face 44, such a shape is not a necessary feature of the invention. The wafer-thin sealing face portion 62 is defined by a deep groove between the face portion of back face 63 and a second inwardly extending angled surface 68 which defines middle section 59. The two surfaces 63,68 intersect at a curve 70 which at least partially defines the neck 64. It should be appreciated, however, that the neck may take other forms and configurations, as is described below with reference to FIGS. 6–13, which other embodiments may be more appropriate for specific applications. The shape of the neck 64 and, indeed, of the ring geometry of seal ring 38, will depend on the particular sealing conditions and on the sealing environment for which the seal 10 is intended.

An important feature providing the most benefit from the present invention is the thin, forward extension portion 62 of the front section immediately adjacent the sealing face 44. It has been found advantageous to maintain the axial dimension of the forward portion 62, that is, the dimension between surfaces 44 and 63, to a minimum thickness, consistent with the requirement to maintain the structural integrity of the seal ring 38. That is, if the seal ring retains its capabilities of providing a sealing face 44 that is parallel to the opposed mating ring sealing face 30, the seal face flexibility resulting from the configuration having a thin sealing face portion 62 provides for better sealing characteristics in specific applications.

This type of seal ring geometry has been found to be especially useful in sealing highly viscous fluids, e.g., oil or petroleum, or other applications in which a great deal of heat is generated in the seal interface which likely produces thermal seal ring deformations, such as coning. The mechanism from which these benefits derive is considered to result from the capability of the seal face 44 to flexibly bend to accommodate a change in its planar orientation relative to the opposed mating ring seal face. The flexibility of a thin sealing face portion 62 results from the ability of the thin piece of material, preferably metal, to bend by flexing at the neck 64 so that it will continue to present a seal face 44 that is parallel to the opposed mating face, irrespective of any coning of the seal ring 38.

Figure 2:
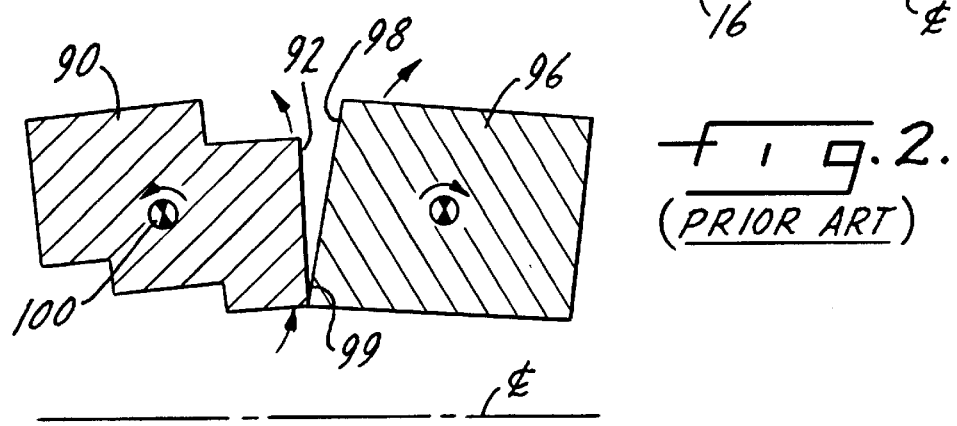
FIG. 2 shows a conventional seal ring pair and a schematically exaggerated "rotation" about the centroid when the seal is under high temperature gradient.
Figure 3:
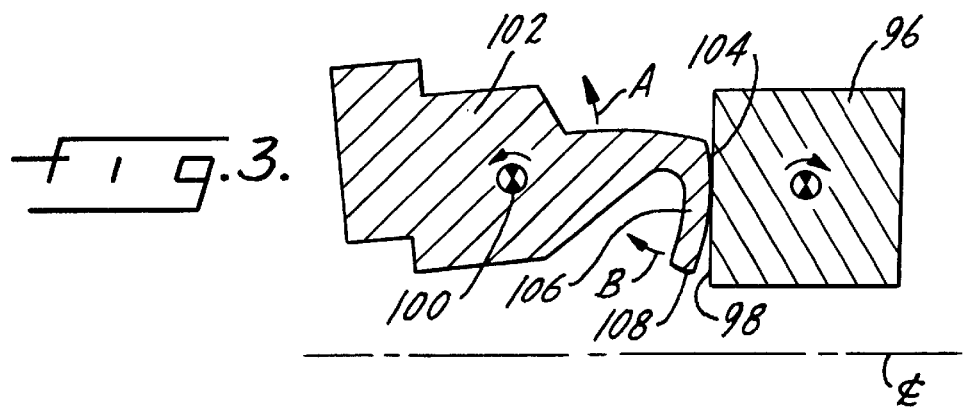
FIG. 3 schematically illustrates a seal ring pair having a primary ring according to the present invention showing in exaggerated not to scale distortion of the seal rings.

As shown schematically in FIGS. 2 and 3, a schematic seal ring cross-section of a conventional seal ring geometry is shown, with a primary seal ring 90 having a seal face 92. The mating ring 96 also has an opposed mating seal face 98.

Seal ring 90 shows a degree of coning which is highly exaggerated in order to indicate the effects of the present invention. As the ring 90 deforms, the outer diameter (O.D.) begins to distort by upward rotation adjacent the seal face 92, the seal gap adjacent the seal ring diameter (I.D.) becomes smaller. This distortion is caused by the heating up of the seal ring mass, and which causes the rotation about a centroid 100, as shown by the arrow.

Opening up of the seal faces 92,98 at the outer diameter (O.D.) results in effects which further deteriorate the sealing capability. For example, in a seal configuration in which the higher pressure fluid being sealed comes into contact with the outer diameter of the seal rings, opening of the seal interface at the O.D. permits entry of the fluid at the higher pressure between the seal faces, further opening the gap between seal faces 92,98. As is well known to those in the industry, the larger the seal gap, the more leakage will result from the seal.

Another effect having a greater tendency to increase seal coning results from the small film thickness at the minimum gap area 99 of the seal interface. The heat becomes concentrated in the seal ring material at the seal ring sealing faces which are directly adjacent the minimal gap area 99. Because the heat is not as easily dissipated, the temperature of the seal ring material increases, especially in the material immediately adjacent the minimal gap 99. This increase in temperature, in turn, causes an even greater amount of seal ring deformation, thereby causing the seal gap to open wider at the outer diameter.

It has been determined that one way to maintain the seal faces parallel in the two rings is to provide flexibility of the seal ring immediately adjacent the sealing face. Referring now to FIG. 3, a schematic rendition of a seal ring 102 is shown having a sealing face 104 adjacent a seal face portion 106. Again, the amount of seal ring deformation of seal ring 102 is exaggerated for illustrative purposes. As the seal faces 98,104 of the seal rings 96,102 begin to run against each other during shaft rotation, shear heating occurs in the seal interface. Sufficient heat is retained in the seal rings 96,102 so as to cause deformation in the rings, including the coning to which seal rings 90,96 (FIG. 2) are susceptible. However, as a result of a feature of this invention, the coning of ring 102, as shown by a rotation in the direction of arrow A, relies upon the flexibility of the seal face portion 106 to orient the seal face 104 relative to sealing face 98 of ring 96 in a parallel orientation, while maintaining a small interfacial gap between the faces.

An important feature of the present invention is the thinness of the seal face portion 106, which is required to provide flexibility to the seal face 104. The thinner the axial width of the seal face portion 106, the more flexible and pliant it becomes, resulting in greater ability and sensitivity of the radial orientation of the seal face 104. However, if the width is excessively thin, the seal would be unable to withstand excessive vibration or rough operation. Accordingly, an optimal mean is necessary, taking into account the considerations of a pliant seal face and providing of a robust seal which would be able to withstand shock and other rough treatment to which seals are occasionally subjected. Appropriate dimensions for the seal face width are set forth below which may be considered as optimal, depending on the expected application.

Although the invention has heretofore been described and illustrated with the primary ring 38 including the thin wafer-like seal face extension 62 and neck 64, it is also considered possible to manufacture a "hard" metallic or carbide mating ring having these features. Such an alternative configuration would permit running a carbon primary ring of conventional cross-sectional configuration, e.g., similar to the cross-section of ring 90 (FIG. 2) against a compliant mating ring (not shown). Such a configuration may require additional adaptations, for example, reduction in the seal face extension thickness, or the radial width of the neck, from that which is specified for the equivalent structure in the primary ring, as described above. The hardness of the mating ring, which normally would render the mating ring less compliant, may be compensated by the thickness reduction to provide the desired compliant seal face extension.

Referring again to FIG. 3, as the seal rings 96,102 generate viscous heat at the seal interface, the deformation of seal ring 102 in the direction of arrow A causes axial force to be exerted on an inner diameter edge 108 to the seal ring 102 in the direction away from the seal interface. The force causes the inner diameter edge 108 of seal face portion 106 to bend in the direction shown by arrow B until the seal face 104 achieves a configuration which is more parallel to seal face 98. As is well known in the sealing industry, parallel seal faces are desirable because leakage of fluid is minimized.

An especially beneficial advantage of the configuration of seal ring 102 is that the seal face parallelity of seal faces 98,104 is independent of the amount of deformation experienced by seal ring 102. That is, the flexibility of the seal face portion 106 will cause it to be bent back only so much as is necessary to maintain a parallel orientation between the seal faces 98, 104. If the deformation of the seal ring 102 is slight, only a little amount of bending of the seal face portion 106 will be experienced. However, more severe seal ring deformation will result in correspondingly more severe bending of seal face portion 106, all the while maintaining seal face parallelity.

Figure 4:
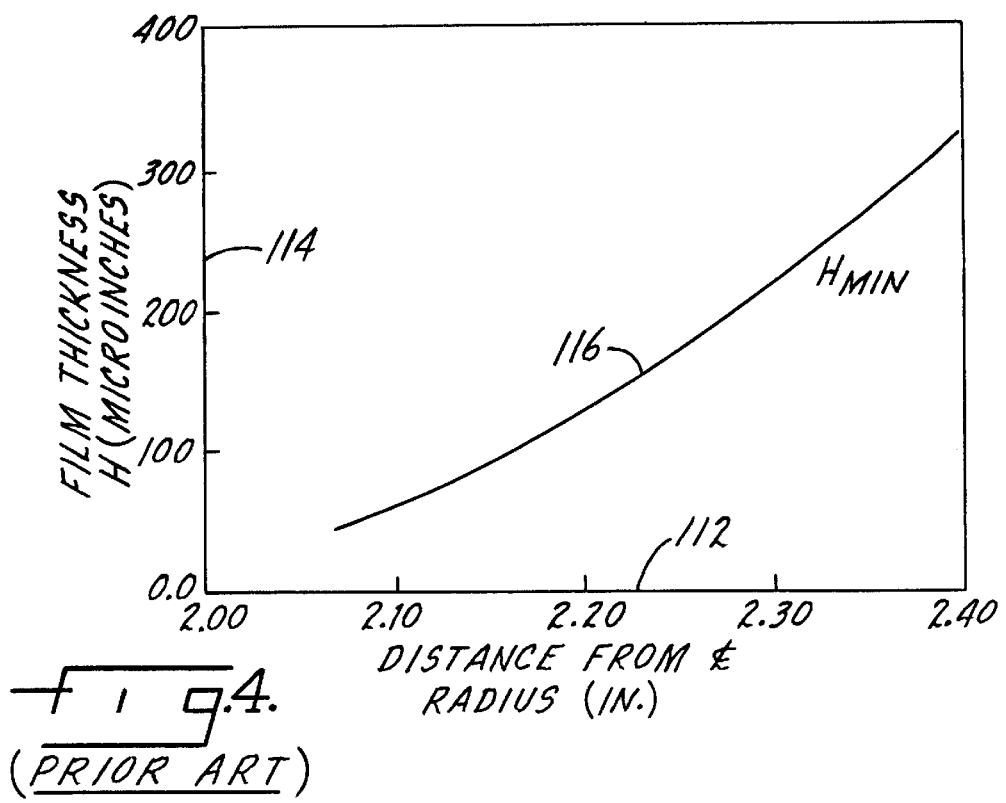
FIG. 4 is a graphic illustration of the film thickness in the interfacial gap of a conventional seal ring pair of FIG. 2, showing the coning of the seal rings.
Figure 5:
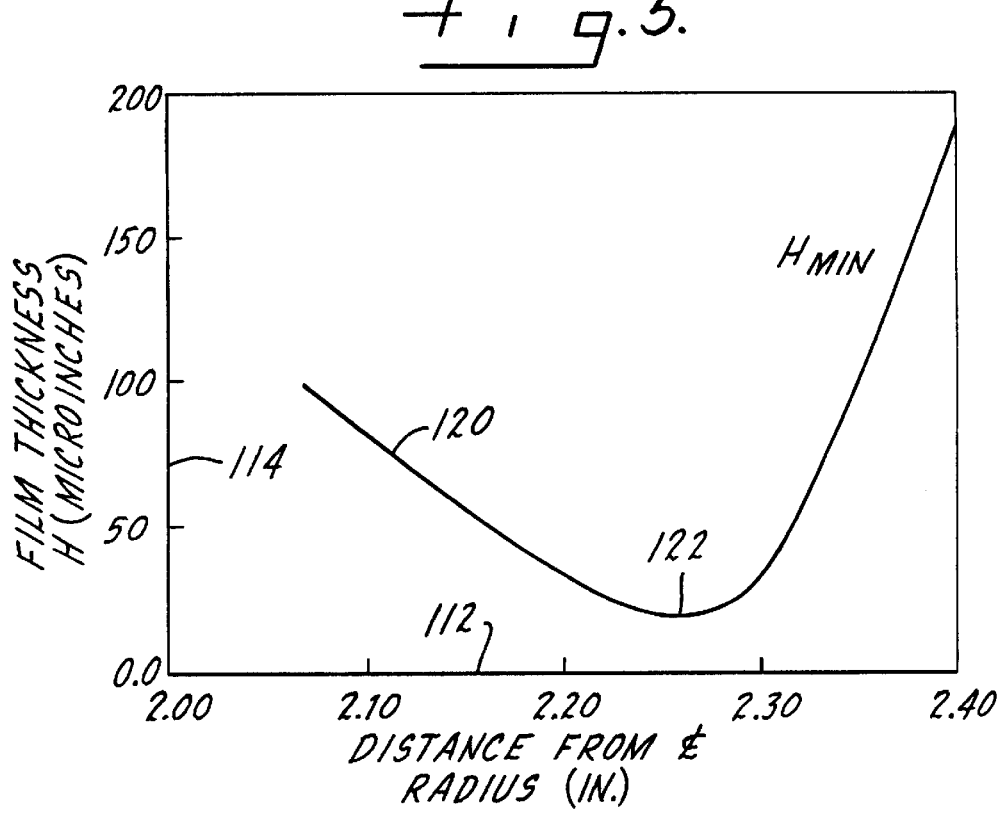
FIG. 5 is a graphic illustration of the film thickness in the interfacial gap of a seal ring pair according to the present invention as in FIG. 3, showing the lack of and compensation for the coning of the primary ring.

A more graphic representation of the advantages derived from the pliant seal face portion 106 over the conventional seals shown in FIG. 2 is found in the graphs of FIGS. 4 and 5. FIG. 4 represents in graph form the seal film thickness of the interfacial gap for a standard configuration as shown in FIG. 2. The abscissa (x-axis) 112 indicates where on the seal faces the measurement of seal film thickness along the ordinate (y-axis) 114 is taken, starting at the inner diameter close to 2.07 inches from the seal ring centerline CL (FIG. 2) to 2.40 inches close to the outer diameter (O.D.). The film thickness of the graph 116 begins about at 40 micro-inches (I.D.) and increases to 330 micro-inches (O.D.), which is consistent with coning of the seal ring.

Conversely, and as shown in FIG. 5, the same values graphed for a seal configuration according to the present invention, i.e., a seal configuration as illustrated in FIG. 3, produces a deep concave graph 120 showing a crowned seal interfacial gap. The graph 120 indicates that, as measured from the inner diameter, the seal film thickness, i.e., the seal gap is about 100 micro-inches, decreases to a minimum value of 18 micro-inches at 122, being about 2.25 inches from the centerline, and then begins increasing to about 180 micro-inches as the measurements are taken toward the outer diameter. Comparison of the two graphs 116,120 shown in FIGS. 4 and 5 should take into account that the scale of the two graphs is different, the units of measurement, microinches, indicated in FIG. 4 showing about twice that of the units of measurement as indicated on the y-axis in FIG. 5. The seal gap even at the outer diameter is about half as large as for a conventional seal.

The graph 120 of film thickness shown in FIG. 5 is consistent with a bending of the seal face portion 106 (FIG. 3) at about its midpoint, and producing a film thickness profile indicative of parallel seal faces. Most advantageously, the minimum low value of the film thickness, at point 122, being much lower than the minimal thickness shown for graph 116 in FIG. 4, provides for a significant improvement in sealing capability and a subsequent reduction in seal leakage.

Figure 6:
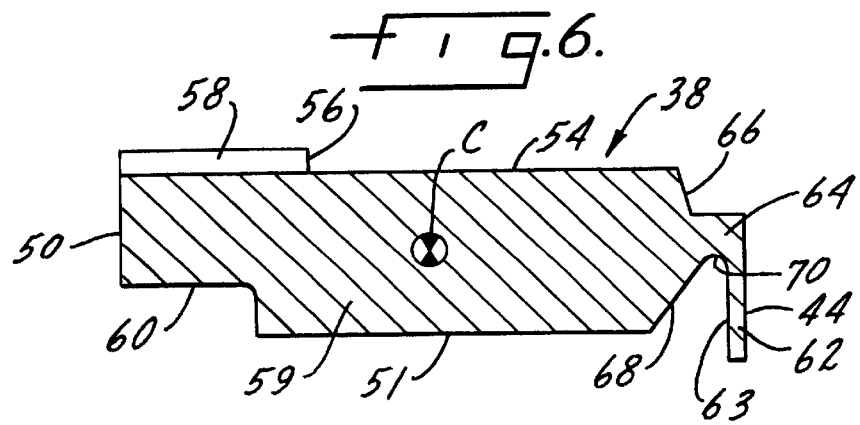
FIG. 6 illustrates an embodiment of a primary ring according to the present invention.

The preferred embodiment of a primary seal ring geometry and cross-sectional configuration is shown in FIG. 6, for a seal ring 38. The identification numerals of the elements of seal ring 38 are identical to those shown in FIG. 1. The geometry of seal ring 38 illustrates the optimal configuration to achieve the sealing capability to provide the seal film thickness shown in FIG. 5. Specifically, the neck 64 of seal ring 38 is optimally disposed at a radius approximate that of the seal centroid C. This is desirable so that axial forces that are exerted on back face 52 are transposed and concentrated onto the neck 64 of the seal ring 38. The axial force thus is concentrated on the portion of seal face 44 and seal interface area that is closest to the neck 64. This geometry and configuration avoids the force concentration on the seal face extension portion 62, to permit flexibility of the seal face extension portion and to alleviate flexing of the seal face extension portion 62 as a result of the spring load. This configuration permits the fulcrum point to be disposed at the seal face 44 approximately at the radius of neck 64, and renders the bending forces on the seal face portion 62 as responsive as possible to the relative orientation opposed mating sealing face of the mating ring 18 (FIG. 1). The exact shape of neck 64 is not of great significance other than sufficient radial thickness in the neck 64 is necessary to assure integrity of the seal ring 38 through rough operation, consistent with a radial width to permit some flexure in the seal face 44 relative to the seal body and middle section 59.

A wide gap at neck inner diameter surface may be necessary for certain sealing applications, for example when the seal is a part of a double seal arrangement, providing for a buffer liquid between them. A wider radial groove, having larger dimensions between the gap wall surfaces, i.e., surfaces 63,68, permits circulation of the buffer liquid within the gap, and thus provides cooling capacity to the seal ring material at the locus of heat generation, normally located adjacent the seal interface.

Referring now to FIGS. 7–11 and 13, several alternative embodiments of inventive primary seal rings are shown. In FIGS. 7–11, like elements to those illustrated in FIGS. 1 and 6 are indicated by identical identification numerals. No individual description of such identical elements is considered necessary, and will not be made herein.

Figures 7, 8:
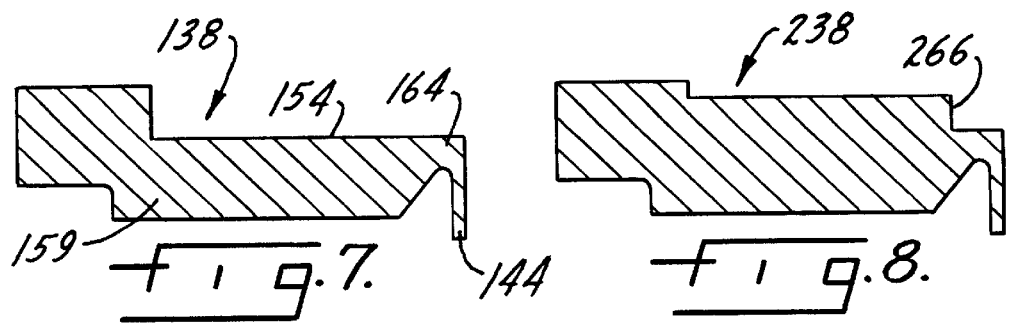
FIG. 7 illustrates yet another embodiment of a primary ring according to the present invention.
FIG. 8 illustrates yet another embodiment of a primary ring according to the present invention.

FIG. 7 shows a similar seal ring geometry of seal ring 138 in which the shoulder extends from the neck 164 to the back section, the other elements such as the radial width of the neck 164 being essentially identical to that of seal ring 38 in FIGS. 1 and 6. The outer diameter cylindrical surface 154 extends from seal face 144 to the back section of seal ring 138. The result is to produce seal ring 138 having a radially thinner middle section 159.

Seal ring 238 shown in FIG. 8 provides for an essentially identical seal ring configuration as the seal ring 38 shown in FIG. 6, with the exception that surface 66 (FIGS. 1 and 6) rather than being tapered has become a radial surface 266 which is perpendicular to the centerline (not shown).

Figure 9:
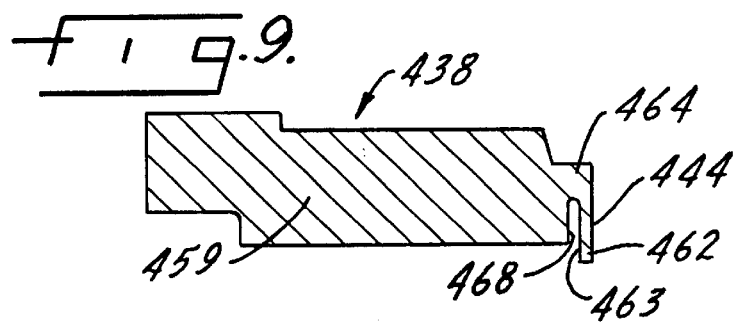
FIG. 9 illustrates yet another embodiment of a primary ring according to the present invention.

Referring now to FIG. 9, an embodiment of a seal ring 438 has a radial groove disposed between the front seal face portion 462 and the portion section 459. The radial groove is defined somewhat differently than the other groove of the embodiments shown in FIGS. 6–8. The surface 468 defining the axial boundary of seal ring middle portion 459 does not extend at a taper or angle, but is perpendicular to the centerline (not shown) rendering the axial dimension of the groove between the surfaces 463 and 468 much narrower than in the other embodiments described above. This does not impair the flexibility of the front seal face portion 462, since it will be able to bend sufficiently so as to maintain seal face parallelity. The radial width of the neck 464 is not different from that width in the other embodiments.

The embodiment of seal ring 438 also more clearly illustrates that the seal face portion 462 and consequently the seal face 444 of seal ring 438 extends radially inwardly to a greater extent than does the body or central portion 459 of the seal ring 438. All of the seal rings 38, 138, 238 and 438 illustrated and described above include a seal face portion which extends radially inwardly further than the mass of body of the ring; the embodiment illustrated in FIG. 9 simply makes that feature more readily apparent.

Figures 10, 11:
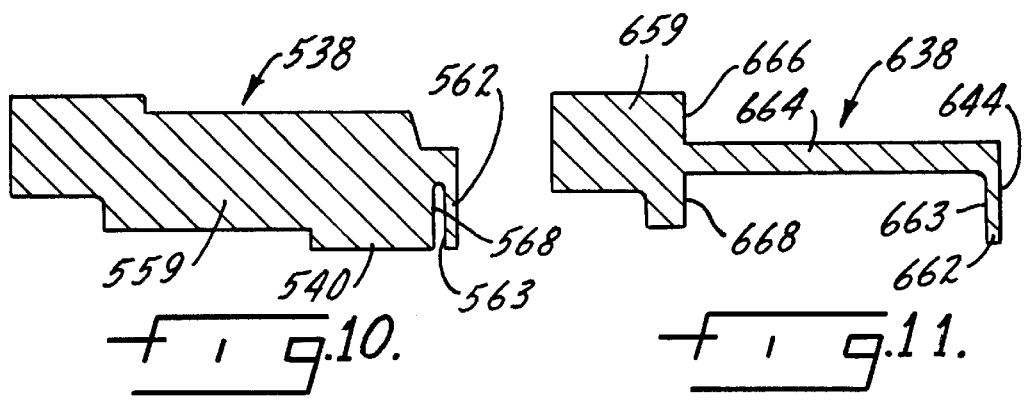
FIG. 10 illustrates yet another embodiment of a primary ring according to the present invention.
FIG. 11 illustrates yet another embodiment of a primary ring according to the present invention.

Referring now to FIG. 10, therein illustrated is another cross-sectional view of an embodiment of a seal ring 538 made in accordance with the teachings of the present invention. The seal ring 538 is in most respects similar to the seal ring 438 illustrated in FIG. 9, with the exception of the thickness of the middle section 559 at a location adjacent the front section 562. As is shown in FIG. 10, the inner diameter of seal ring 538 includes a radially inwardly extending shoulder 540, which renders the inner gap between surfaces 563 and 568 longer in the radial direction. The radial dimension of annular surface 563 is identical or similar to that dimension as shown in the embodiments 38, 138, 238, 438, but the location of the shoulder 540 adjacent the gap lengthens the radial dimension of annular surface 568. In this embodiment, the inner diameter of seal ring 538 is identical at both axial locations defining the gap, i.e., the shoulder 540 and the front seal face section 562 have identical inner diameter dimensions.

Referring now to FIG. 11, an embodiment of seal ring 638 has a shape and dimensions which render the seal face portion 662 highly flexible to accommodate the fluid pressures to which the seal ring 638 and seal are subjected. The axial elongation of the neck portion 664 to an extreme degree illustrates the capability for design of seal rings made according to this invention such that different sealing parameters may be accommodated. The radial dimension of the neck 664 is identical to the same dimension in the other primary seal ring embodiments 38, 138, 238, 438 and 538. However, because of the flexibility provided by the axially lengthened neck 664, the seal face 644 becomes much more compliant to the seal ring distortions caused by thermal and pressure effects acting on the seal ring 638. In seal ring 638, the surfaces 666, 668, defining the axial boundaries of middle portion 659, are at the same relative axial position and may be in the same plane.

Figure 12:
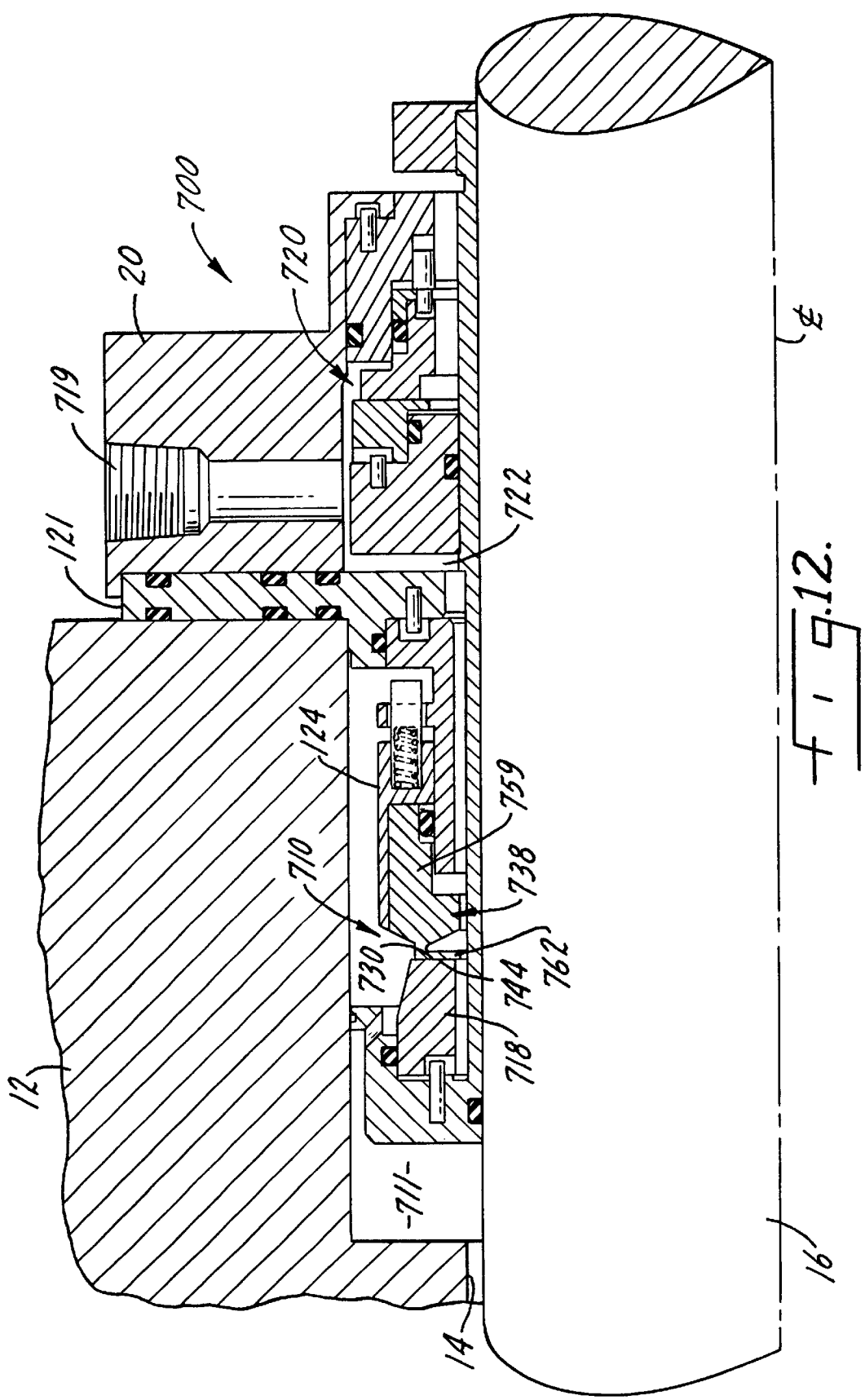
FIG. 12 illustrates a dual non-contacting mechanical seal arrangement in which the primary seal rings of each seal incorporated features according to the present invention.

Referring now to FIG. 12, an operational dual seal arrangement 700 is illustrated in which an upstream or inboard seal 710 and a downstream or outboard seal 720 define between them an annular buffer chamber 722.

Because the seal ring configurations of seals 710 have been discussed above, and the seal 720 may comprise a conventional contacting or non-contacting seal, the seal configurations will not be discussed in any great detail. For a more detailed discussion of the conventional seals, reference is made to the above-identified patents.

The seals 710, 720 are shown installed around a shaft 16 and the connection of glands 20, 120 to the housing 12 is made by conventional means, for example, by bolts, such as bolts 24 illustrated and described with reference to seal 10 shown in FIG. 1. The seal configuration of seal 710 includes various elements not shown in the embodiment of FIG. 1, such as a primary ring retainer 124 which is axially movable relative to the housing 12.

The configuration 710 illustrates a primary ring 738 which has a sealing face 744 facing toward housing 12, a different orientation than that shown in the seal 10 of FIG. 1. Also illustrated is the alternative configuration in which a primary ring does not rotate with the shaft 16, but is stationary relative to housing 12. Other alternative configurations may include a seal configuration in which the inner diameter of the seal rings is in contact with the process fluid. This may be possible if the other elements of the invention are incorporated in a modified form; such as having a gap between the seal ring forward and middle sections exposed to the environment external or outboard of the seal, if necessary. Alterations and modifications such as those described above are within the purview of a person having ordinary skill in the art and are contemplated as being encompassed by this invention.

Referring again to FIG. 12, the dual seal arrangement 700 has been utilized in sealing a process fluid, such as a highly viscous oil, with the housing 12. The process fluid enters chamber 711 through bore 14. The viscosity of the oil prevents good circulation of the process fluid in chamber 711 around the seal rings 718, 738. One means of cooling the seal rings 718, 738 is to introduce circulation of a buffer fluid in the chamber 722. The buffer fluid may be provided and introduced into chamber 722 through a port, such as port 719.

In these types of applications, an organic buffer fluid having low viscosity is optimal. Kerosene has been utilized as a buffer fluid, both because of its low viscosity, enabling it to circulate and provide fluid cooling to the seal rings 718, 738 at their inner diameters, and even to circulate through the gap between seal face section 762 and the primary ring middle section 759. Kerosene is also preferable to other buffer fluid because it does not contaminate process fluid, such as oil or petroleum which may be sealed within the housing 12, by diluting the process fluid with incompatible ingredients.

During seal operation, as shaft 16 is rotated, rubbing friction or shear heating causes the seal rings 718, 738 to heat up at the seal interface. As the seal rings begin to cone outwardly at the outer diameter in accordance with the phenomenon described above, the seal in face portion 762 flexes inwardly to maintain a parallel relation between seal face 744 and the opposed sealing face 730 of the mating ring 718. The conventional seal 720 at the outboard side of the chamber 722 provides a second seal so that the buffer fluid is sealed within the chamber 720. Although a contacting mechanical face seal comprises the seal 720, it is contemplated that other types of seals, such as a lip seal, may also provide adequate seals to retain the buffer fluid within chamber 722.

The seal arrangement 700 shown in FIG. 12, including a kerosene buffer fluid, has been found to be very effective for sealing viscous process fluids, such as oil. Utilizing a primary ring, such as ring 738, all other elements being identical, was found to reduce process fluid leakage substantially, on the order of 8 to over 30 times less leakage.

Other additional alternative seal ring configurations are contemplated as coming within the scope of the invention. FIG. 13 illustrates a conventional mating ring 896, having a planar seal face 898 and a primary ring 890 including an opposed, mating seal face 892. The shapes of the seal rings 890, 896 are somewhat exaggerated in this finite element analysis rendition to illustrate the effect of the temperature differentials provided by the compliance of the front or seal face extension portion 862. The seal configuration shown in FIG. 13 includes seal face extension portion 862 which includes a lengthened seal face 892 extending radially inwardly of neck 864, similar to the embodiments illustrated in FIGS. 1 and 6–11. However, seal face extension 862 further includes a second extension portion 863 that extends radially outwardly from the neck 864.

The primary ring 890 is shown in FIG. 13 as an element in a finite element analysis undergoing the stress of a high pressure and temperature deformation during use of the seal. Coning is evident in the rotation of that portion of the seal ring body 890 closest to the neck 864, as shown by the arrow. The exaggerated flexing of the neck 864 is a feature of the illustration to show the direction and amount of the seal ring deformation.

Finite element analysis indicates that the opening up of the gap between the seal faces at the seal face section adjacent the outer diameter extension portion 863, known to persons having ordinary skill as convergence of the seal faces as measured from the pressurized outer diameter toward the lower pressure inner diameter, may slightly increase the amount of leakage. Such a configuration may have more leakage than a similar configuration, such as the seal ring configuration of FIG. 1, e.g., seal ring 38, since the convergence of the seal faces at the outer diameter permits egress into the seal interface of the process fluid under high pressures. This causes the seal faces to separate, creating a limited increase in the seal gap. However, it is contemplated that the extra convergence of seal faces at the outer diameter may help the seal operation under severe operating conditions, and the increase in seal leakage may be tolerated because of the stability provided by the converging seal gap.

FIGS. 14 and 15 provide a schematic illustration of the maintenance of parallel seal faces in an inner diameter pressurized non-contacting seal utilizing the teachings of the present invention. It should be understood that the amount of coning and seal face divergence shown in FIGS. 14 and 15 is exaggerated because the seal rings are not shown true to scale.

FIG. 14 shows a finite element analysis graphic rendition of a conventional non-contacting seal arrangement in which the fluid to be sealed is contained at the inner diameter of the seal ring pair. One seal ring 990 has a seal face 992, and the other seal ring 996 has an opposed, mating seal face 998. When the seal rings are exposed to a higher-pressure fluid at the inner diameter, the seal ring faces 992, 998 diverge, as measured from the inner diameter to the outer diameter.

FIG. 15 illustrates a primary seal ring 902 having a seal extension portion 906 and a neck 964. The coning divergence of the seal middle portion 959 outwardly from the centerline CL causes flexing of the neck 964 to bend the seal face extension portion 906. This flexure thereby causes the seal faces 904, 998 to remain parallel, and the seal gap between the seal faces to remain essentially constant from the inner diameter to the outer diameter, which permits a more stable operation and at a larger seal gap.

Manufacture of a seal ring made according to the present invention may follow conventional techniques. The inventive seal design and geometry may be utilized on seal rings comprising many different materials. A Ni-Resist material has been found to provide excellent leakage reduction, but other materials, such as bronze, Stellite, carbon-graphites, ceramics and carbides, may be used for the seal ring. Metals, however, are preferable because their properties, such as ductility, flexibility and resilience, provide for easy machining of the seal face portion and the neck between that portion and the body of the seal ring.

The features of this invention are applicable for various size shafts. Accommodating the shaft size by using different size seal rings is known in the seal industry. Thus, the relative size of the primary seal ring portions may be used as a guide for the seal ring construction. For example, a typical shaft diameter of about 4¾ inches, the size of the primary ring seal face section may be larger than for a 2 inch shaft diameter, simply because the ring size is greater. However, the relative sizes of elements within a wide range of seal ring sizes may be considered a good structural parameter for a seal ring. For example, irrespective of the size of seal ring, a range of dimensions of a ratio between the axial thickness of the seal face portion 62 relative to the width of seal face 44 may be in a range of from about 0.03 to about 0.60, more preferably between 0.05 to about 0.50, and most preferably about 0.08 to about 0.15, recognizing that the optimal ratio will depend on the sealing conditions.

The thickness for metallic annular rings of the front seal face portion has been found acceptable in the range of a between about 0.007 to about 0.150 inches. A more optimal range may be found between about 0.04 to about 0.10 inches.

Because machining very thin sections may be difficult, an alternative method of attaching the seal face section to the seal ring body may be utilized. One such method comprises welding a thin metal annular diaphragm to a neck which has been machined to one end of a metal seal ring.

The radial dimension of the neck also will depend to some extent on the sealing conditions, on the shaft diameter and on the size of the seal rings. A ratio for the neck size relative to the seal face width is preferable in a range of from about 0.10 to about 0.70, and more preferably of from about 0.25 to about 0.60, and most preferably the ratio should be approximately about 0.40.

The radial dimension (thickness) of the neck in each of the embodiments described above should also be thin enough to provide a compliant seal face portion. An acceptable range in the radial dimension of the neck is between about 0.03 to about 0.25 inches. A more preferable range is considered between about 0.06 to about 0.15 inches, and for a shaft diameter of 4.75 inches, a neck thickness is optimally at about 0.10 inches.

As can be appreciated in designing very thin front seal face portions and necks, the metallic ones may be better suited for the lower ranges in which thinner seal face portions are provided. For seal rings machined from more brittle materials, such as carbon-graphites, the higher ranges or thicker portions and necks toward the upper end of each range should be considered.

It is contemplated that seals made according to the present invention may be utilized in viscous process fluid applications in which very low leakage rates are required and the process fluid is maintained at a very low pressure, e.g., 50 psig, or under varying pressure conditions, in which the process fluid pressure may vary between 50 to 500 psig. Other process fluids may be sealed within a housing by seal arrangements utilizing this invention. For example, water or light hydrocarbon fluids may be sealed adequately, as long as modifications are made to the seal design and seal ring configurations.

This invention is also usable with a pressurized pumping groove seal in which the high pressure comes into contact with the outer diameter of the seal rings. Such a modification may require that the pumping grooves be exposed at their outer diameter to the fluid in the respective chamber, but the decrease in radial dimension of the primary ring middle portion may be made either at the inner diameter of the ring or at the outer diameter, depending on the particular application. Alternatively, the inventive features may be utilized with a seal arrangement in which the grooves are exposed to the lower pressure fluid, as in seals made in accordance with commonly owned U.S. Pat. No. 4,290,611, in which the pumping grooves are exposed to the lower pressure of buffer fluid, with the understanding that appropriate other modifications may be necessary.

Other alterations and modifications may also become obvious to a person of ordinary skill in the art after a full understanding of the present invention is attained. For these reasons the above embodiments should be considered as examples only, and not as limiting the scope of this invention. The scope of the invention should only be considered limited by the following claims.

What is claimed is:

1. A mechanical face seal for sealing fluid under pressure between a housing and a relatively rotating shaft extending through a bore in the housing, the seal comprising:
   a) an annular first seal ring having a first seal face adapted to be disposed annularly about the shaft and adapted to be secured in fluid tight relation to one of a shaft or housing;
   b) a second seal ring adapted to be disposed annularly about the shaft and adapted to be secured in fluid tight relation to the other of the shaft or the housing, said second seal ring having a seal body and seal face extension portion, said seal face extension portion including a radial second annular seal face having a predetermined radial width and being in opposing mating relation with the first seal face to define a seal interface, and a neck attaching said seal body to said seal face extension portion, said seal face extension portion includes a back face extending radially to said neck and said seal body is defined by a radially extending surface which meets said seal face extension portion back face at an annular intersection surface adjacent the neck, said neck having a radial thickness defined between said intersection surface and an outer diameter neck surface; and
   c) a biasing means for urging said ring seal faces toward each other into a confronting, mating relationship.

2. The mechanical face seal according to claim 1 wherein the maximum axial thickness of said seal face extension portion is in a range of from about 0.007 to 0.150 inches.

3. The mechanical face seal according to claim 1 wherein the maximum axial thickness of said seal face extension portion is in a range of from about 0.04 to 0.10 inches.

4. The mechanical face seal according to claim 1 wherein the ratio of the axial thickness of the seal face extension portion relative to the radial width of the second seal face is in a range of from about 0.03 to about 0.60.

5. The mechanical face seal according to claim 1 wherein the ratio of the axial thickness of the seal face extension portion relative to the radial width of the second seal face is in a range of from about 0.05 to about 0.50.

6. The mechanical face seal according to claim 1 wherein the ratio of the axial thickness of the seal face extension portion relative to the radial width of the second seal face is in a range of from about 0.08 to about 0.15.

7. The mechanical face seal according to claim 1 wherein the ratio of the radial width of said neck relative to the radial width of the second seal face is in a range of from about 0.10 to about 0.70.

8. The mechanical face seal according to claim 1 wherein the ratio of the radial width of said neck relative to the radial width of the second seal face is in a range of from about 0.25 to about 0.60.

9. The mechanical face seal according to claim 1 wherein the ratio of the radial width of said neck relative to the radial width of the second seal face is in a range of from about 0.35 to about 0.45.

10. The mechanical face seal according to claim 1 wherein said neck radial thickness being in a ratio relative to the radial width of said second annular seal face of from between about 0.10 to about 0.70.

11. The mechanical face seal according to claim 1 wherein said neck radial thickness being in a ratio relative to the radial width of said second annular seal face of from between about 0.25 to about 0.60.

12. The mechanical face seal according to claim 1 wherein said neck radial thickness being in a ratio relative to the radial width of said second annular seal face of from between about 0.35 to about 0.45.

13. The mechanical face seal according to claim 1 wherein said seal face extension portion includes a first extension section extending radially outwardly of said neck portion and a second extension section extending radially inwardly of said neck portion.

14. The mechanical face seal according to claim 13 wherein the maximum axial thickness of said seal face extension portion is in a range of from about 0.007 to 0.150 inches.

15. The mechanical face seal according to claim 13 wherein the maximum axial thickness of said seal face extension portion is in a range of from about 0.04 to 0.10 inches.

16. The mechanical face seal according to claim 13 wherein the ratio of the axial thickness of the seal face extension portion relative to the radial width of the second seal face is in a range of from about 0.03 to about 0.60.

17. The mechanical face seal according to claim 13 wherein the ratio of the axial thickness of the seal face extension portion relative to the radial width of the second seal face is in a range of from about 0.05 to about 0.50.

18. The mechanical face seal according to claim 13 wherein the ratio of the axial thickness of the seal face extension portion relative to the radial width of the second seal face is in a range of from about 0.08 to about 0.15.

19. The mechanical face seal according to claim 13 wherein the ratio of the radial width of said neck relative to the radial width of the second seal face is in a range of from about 0.10 to about 0.70.

20. The mechanical face seal according to claim 13 wherein the ratio of the radial width of said neck relative to the radial width of the second seal face is in a range of from about 0.25 to about 0.60.

21. The mechanical face seal according to claim 13 wherein the ratio of the radial width of said neck relative to the radial width of the second seal face is in a range of from about 0.35 to about 0.45.

22. The mechanical face seal according to claim 13 wherein the second seal ring is an axially movable primary ring.

23. The mechanical face seal according to claim 13 wherein said mechanical face seal further comprises a non-contacting gas seal arrangement.

24. The mechanical face seal according to claim 1 wherein the second seal ring is an axially movable primary ring.

25. The mechanical face seal according to claim 1 wherein said mechanical face seal further comprises a non-contacting gas seal arrangement.

* * * * *